US007530698B2

(12) United States Patent
Chang et al.

(10) Patent No.: US 7,530,698 B2
(45) Date of Patent: May 12, 2009

(54) POSITIONING DEVICE FOR A PROJECTION APPARATUS

(75) Inventors: Tai-Li Chang, Miao Li County (TW); Wen-Chi Fu, Taipei Hsien (TW); Chun-How Shao, Miao Li County (TW)

(73) Assignee: Coretronic Corporation, Chu Nan, Miao Li County (TW)

( * ) Notice: Subject to any disclaimer, the term of this patent is extended or adjusted under 35 U.S.C. 154(b) by 291 days.

(21) Appl. No.: 11/541,686

(22) Filed: Oct. 3, 2006

(65) Prior Publication Data

US 2007/0109778 A1 May 17, 2007

(30) Foreign Application Priority Data

Nov. 11, 2005 (TW) ............................... 94139637 A

(51) Int. Cl.
*G03B 21/14* (2006.01)
*G03B 21/22* (2006.01)
*G03B 21/28* (2006.01)
*G01D 11/28* (2006.01)
*G03H 1/00* (2006.01)
*G02B 6/00* (2006.01)

(52) U.S. Cl. ................. 353/119; 353/97; 353/99; 362/26; 362/551; 359/34; 385/133

(58) Field of Classification Search ................. 353/119, 353/97, 98, 99; 362/26, 551; 359/34; 385/129, 385/132, 133
See application file for complete search history.

(56) References Cited

U.S. PATENT DOCUMENTS

2006/0008228 A1* 1/2006 Kitamura et al. ............ 385/133

\* cited by examiner

*Primary Examiner*—Diane I Lee
*Assistant Examiner*—Magda Cruz
(74) *Attorney, Agent, or Firm*—Birch, Stewart, Kolasch & Birch, LLP

(57) ABSTRACT

A positioning device for positioning an integration rod module disposed in an optical path between a light source device and a projection lens within a projection apparatus includes a flexible element having a fixing plate section mounted securely on an inner surface of a casing interconnecting the light source device and the projection lens and enclosing the integration rod module, and a first distal plate section extending integrally from one end of the fixing plate section toward a rod cover mounted on the casing for resiliently urging a holder of the rod module to press against the inner surface of the casing at a position opposite to the flexible element. A stop member is disposed securely on the holder adjacent to the rod cover to facilitate abutment of the first distal plate section of the flexible element against the holder to enhance retention of the rod module within the casing.

10 Claims, 6 Drawing Sheets

POSITIONING DEVICE FOR A PROJECTION APPARATUS

FIELD OF THE INVENTION

The invention relates to a projection apparatus, and more particularly to a projection apparatus having a positioning device for positioning an integration rod module.

BACKGROUND OF THE INVENTION

Referring to FIGS. 1 and 2, a perspective view of an interior of a conventional projection apparatus 2 is shown. The conventional projection apparatus 2 includes a light source device 4, a projection lens 6 and a casing 8 covering an optical path between the light source device 4 and the projection lens 6. An integration rod module 10 is disposed within the casing 8, and in the optical path.

A rod cover 12 is disposed securely on one side of the casing 8 adjacent to the light source device 4 such that light beams emitted from the light source device 4 pass through a light aperture of the rod cover 12. Besides, the light beams enter from the front of the integration rod module 10 into the projection lens 6.

The integration rod module 10 includes an integration rod 1002 extending along the optical path and a holder 1004 enclosing the integration rod 1002 therein. Generally, a positioning device 16 is installed in the projection apparatus 2 to position the integration rod module 10 within the casing 8.

Referring to FIG. 3, the positioning device 16 includes an upper flexible element 18 and a lower flexible element 19. The upper flexible element 18 has an intermediate section fixed to an upper inner surface of the casing 8, and two ends extending from the intermediate section to front and rear ends of the integration rod module 10 respectively. The ends of the upper flexible element 18 have elasticity to press against an upper surface of the holder 1004 and the elasticity provides a balance force that presses against a lower interior surface of the casing 8 to support a lower surface of the holder 1004. Thus, the integration rod module 10 is retained between the upper and lower interior surfaces of the casing 8.

In addition, the lower flexible element 19 is disposed within the lower surface of the holder 1004, and one elastic end of the lower flexible element 19 extends downwardly. The elastic end presses against a longitudinally extended bottom part 802 of the lower surface of the casing 8 to provide a force in a direction from the integration rod module 10 to the rod cover 12. Thus, the force in the direction from the integration rod module 10 to the rod cover 12 balances a support force that the rod cover 12 presses against the front end of the integration rod module 10. The integration rod module 10 is indeed positioned within the casing 8.

As shown in FIG. 3, a counterclockwise torque M caused by the lower flexible element 19 causes the integration rod module 10 to uplift, and then the front end of an integration rod 1002 presses against the rod cover 12 tightly. It leads to the incorrect position of the integration rod 1002, and concentrates stresses on the front end of the integration rod 1002 to cause damage to the integration rod 102.

Moreover, the torque M counteracts and cancels out a portion of the elasticity of the upper flexible element 18. After assembly of the conventional projection apparatus 2, the integration rod module 10 is easy to be displaced in case of receiving a terrible vibration or shock. Since one front end of the integration rod module 10 is in tight abutment against the rod cover 12, it is relatively difficult for the same to retrieve the initial position of the integration rod 10 within the casing 8. Displacement of the integration rod 1002 degrades the light projection ability of the conventional projection apparatus 2.

SUMMARY OF THE INVENTION

It is the object of the present invention to provide a positioning device for positioning an integration rod module disposed on an optical path defined by a light source device and a projection lens of a projection apparatus such that the integration rod module is not displaced because of shocks.

In one aspect of the present invention, a positioning device is provided for positioning an integration rod module disposed on an optical path defined by a light source device and a projection lens of a projection apparatus. The integration rod module is disposed within a casing of the projection apparatus. The integration rod module includes an integration rod and a holder that encloses the integration rod therein and that defines an optical path. A rod cover is disposed securely on the casing adjacent to the light source device, and the light beams emitted from the light source device transmitted into the integration rod via an aperture of the rod cover. The positioning device further includes a flexible element and a stop member. The flexible element has a fixing plate section adapted to be mounted securely on an inner surface of the casing and a first distal plate section extending integrally from one end of the fixing plate section toward the rod cover for resiliently urging the holder, thereby retaining the integration rod module within the casing. The stop member is disposed securely on the holder adjacent to the rod cover and disposed between the first distal plate section and the rod cover. The first distal plate section urges the stop member to facilitate one end of the integration rod module being against the rod cover so as to enhance retention of the integration rod module within the casing.

In a second aspect of the present invention, a projection apparatus is provided and includes a light source device for generating light beams, a projection lens for projecting an image onto a screen, a casing enclosing an optical path defined by the light source device and the projection lens, an integration rod module disposed within the casing on the optical path, the integration rod module including an integration rod and a holder that encloses the integration rod therein, a rod cover disposed on the casing adjacent to the light source device, and a position device. The positioning device for positioning the integration rod module within the casing includes a flexible element and a stop member. The integration rod module is not displaced easily because of a shock.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTIONS OF THE PREFERRED EMBODIMENT

The present invention relates to a projection apparatus and a positioning device for positioning an integration rod module within the projection apparatus.

Figure 1:
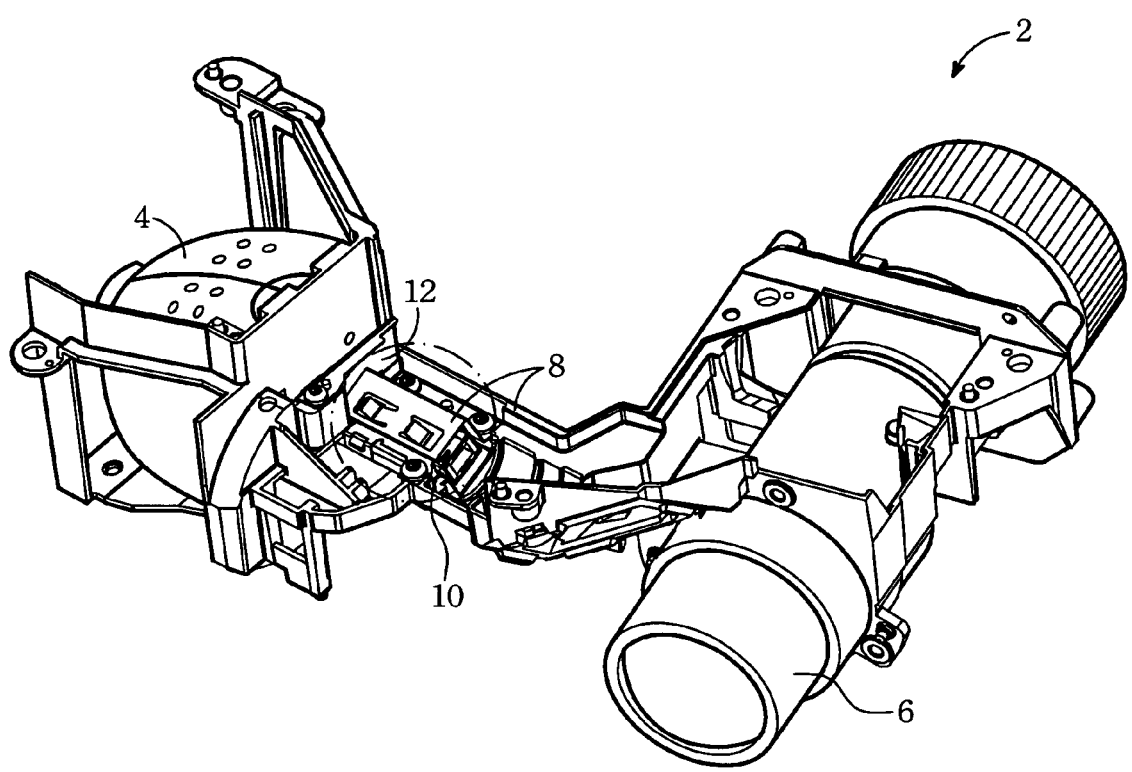
FIG. 1 is a perspective view illustrating an interior of a conventional projection apparatus.
Figure 2:
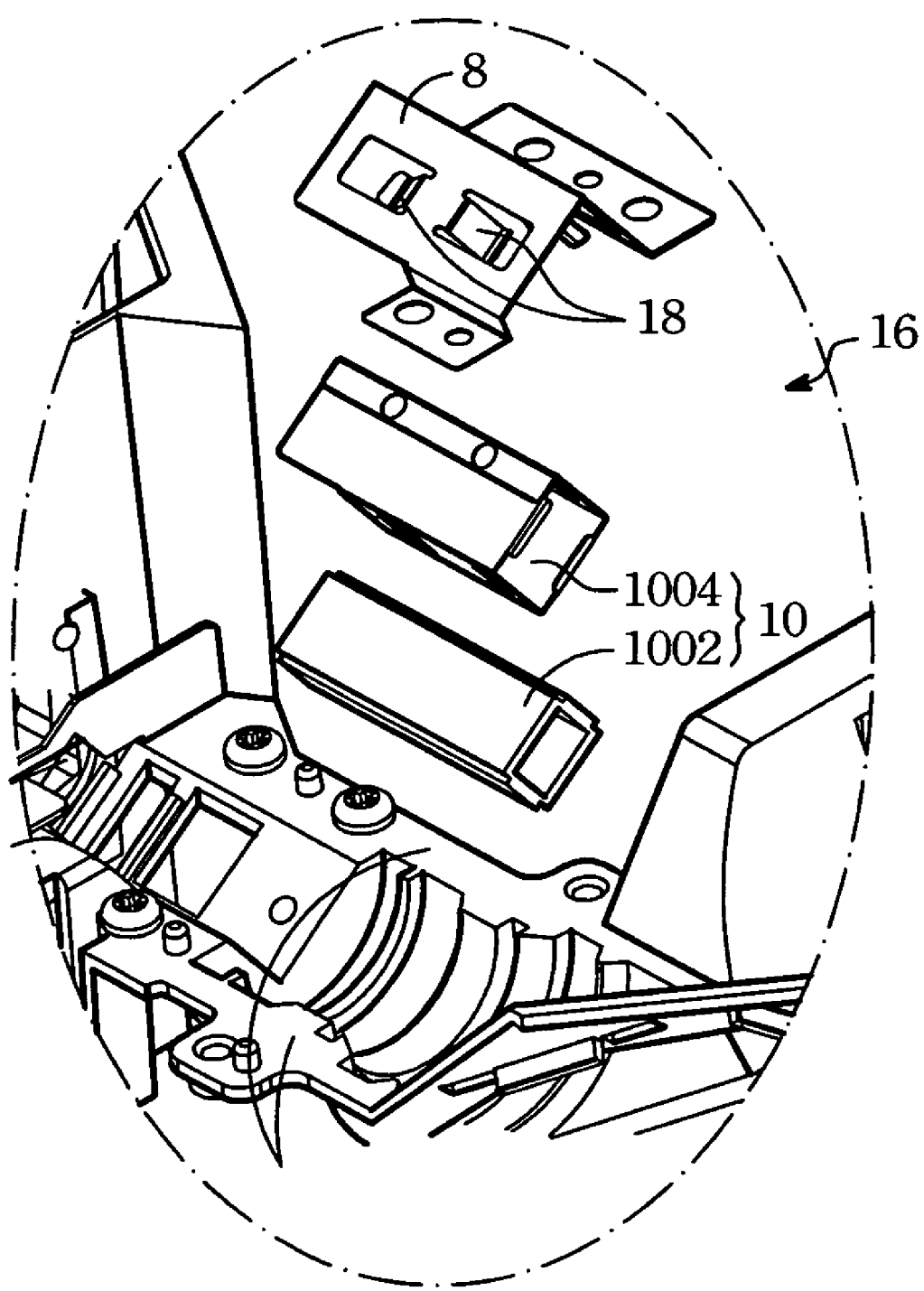
FIG. 2 is an enlarged view of an encircled portion of the conventional projection apparatus of FIG. 1.
Figure 3:
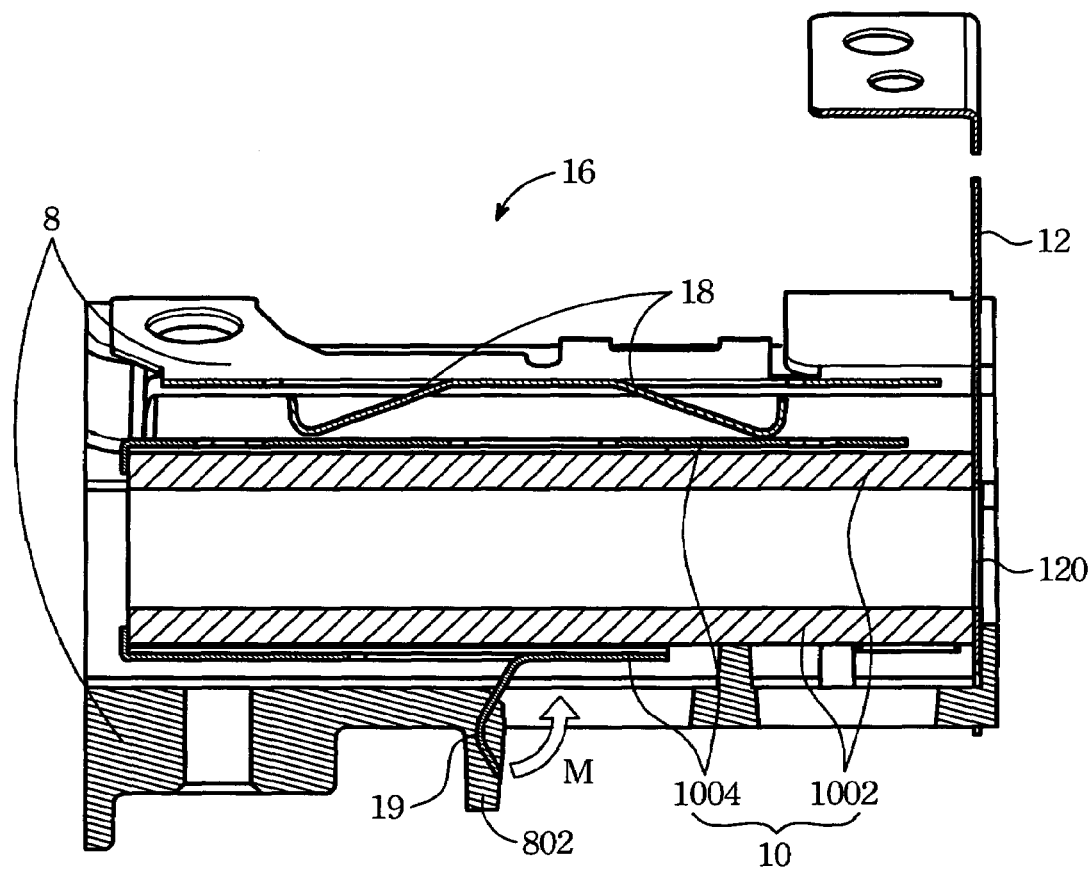
FIG. 3 is a cross-sectional view of positioning device for the conventional projection apparatus shown in FIG. 1.
Figure 4:
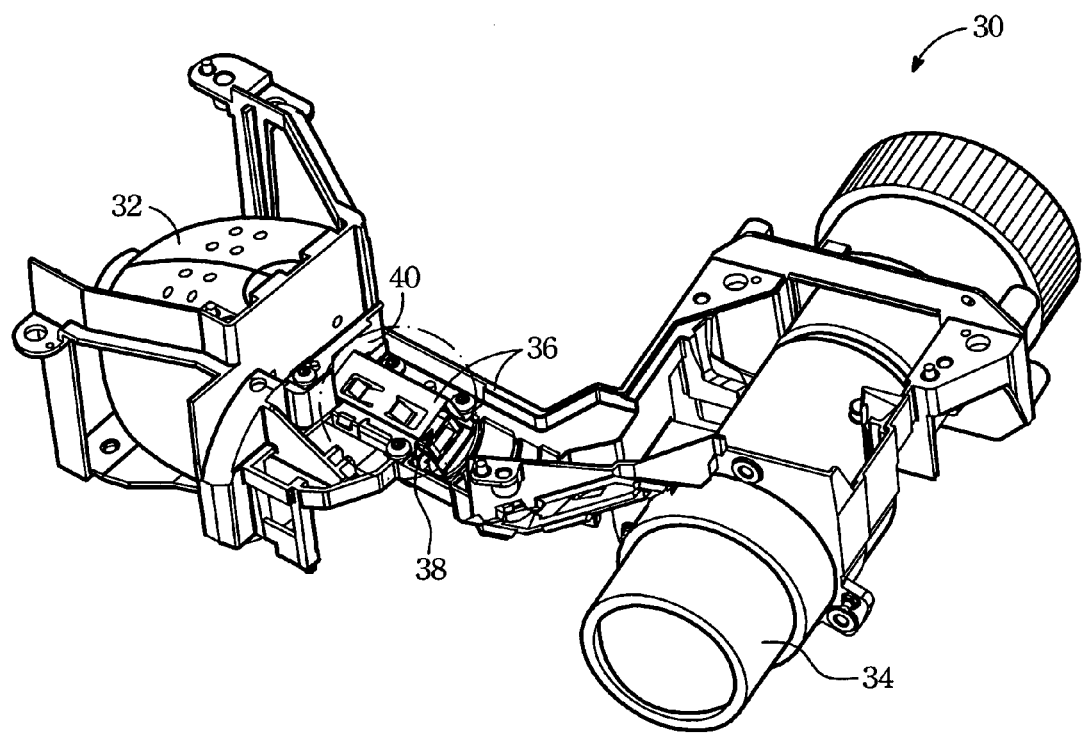
FIG. 4 is a perspective view illustrating an interior of a projection apparatus according to a preferred embodiment of the present invention.
Figure 5:
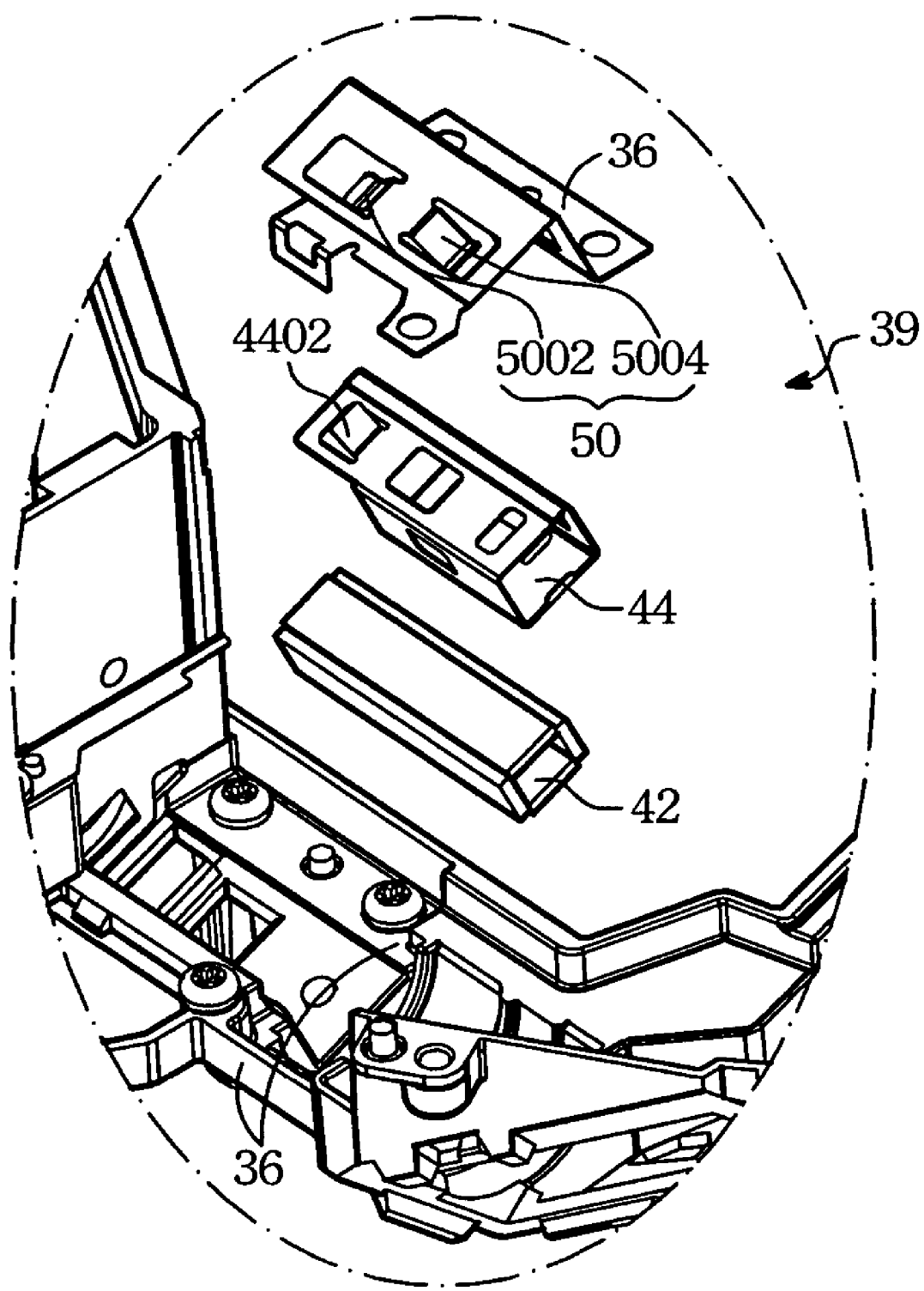
FIG. 5 is an enlarged view of an encircled portion of the projection apparatus according to the present invention shown in FIG. 4.
Figure 6:
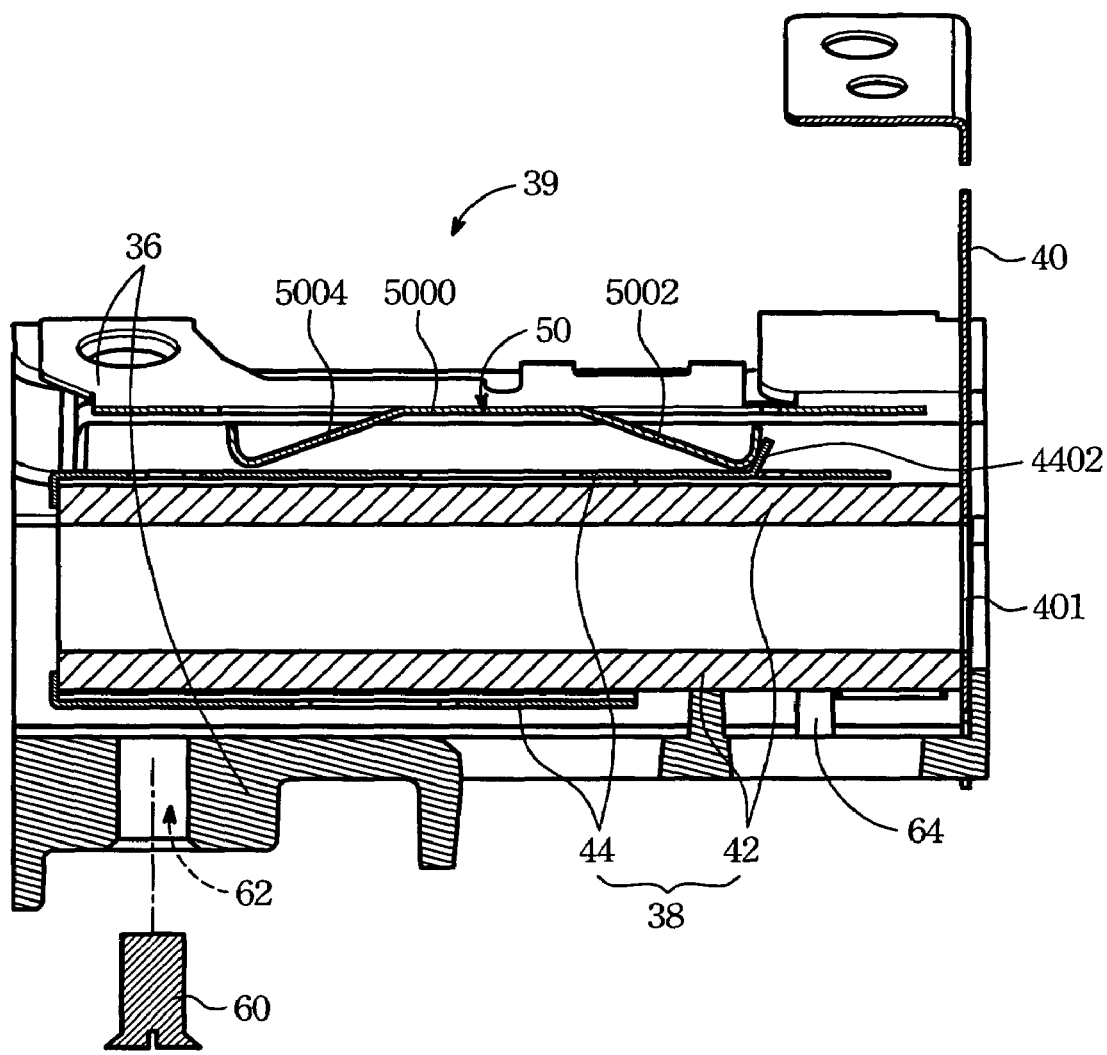
FIG. 6 is a cross-sectional view of a positioning device for the projection apparatus in FIG. 4.

Referring to FIGS. 4, 5 and 6, a projection apparatus 30 according to a preferred embodiment of the present invention includes a light source device 32, a projection lens 34, a casing 36, an integration rod module 38, a rod cover 40, and a positioning device 39.

The light source device 32 is capable of generating light beams. The projection lens 34 is disposed and spaced apart from the light source device 32 to project an image onto a screen (not shown) disposed away from the projection apparatus 30.

The casing 36 is disposed in the projection apparatus 30. The casing 36 is disposed on an optical path defined by the light source device 32 and the projection lens 34 for guiding the light beams emitted from the light source device 32 toward the projection lens 34. The rod cover 40 is disposed securely on one end of the casing 36 adjacent to the light source device 32. The casing 36 and a flexible element 50 are formed integrally. In this embodiment, the casing 36 includes a lower portion and an upper metal plate that is punched in such a manner to form the flexible element 50 that is later disposed on the lower portion.

The integration rod module 38 is disposed within the casing 36, and includes an integration rod 42 extending along the optical path and a holder 44 enclosing the integration rod 42. The light beams emitted from the light source device 32 are transmitted into the integration rod 42 via an aperture of the rod cover 34 and then projected into the projection lens 34.

The positioning device 39 is used for positioning the integration rod module 38 within the casing 36, and includes a flexible element 50 and a stop member 4402. The flexible element 50 includes a fixing plate section 5000 mounted securely on an inner surface of the casing 36, and a first distal plate section 5002 extending integrally from one end of the fixing plate section 5000 toward the rod cover 40 for resiliently urging the holder 44 to press the integration rod module 38 against the inner surface of the casing 36 at a position opposite to the flexible element 50. The stop member 4402 is disposed securely on the holder 44 adjacent to the rod cover 40 and the flexible element 50. The holder 44 and the stop member 4402 are formed integrally to facilitate abutment of the first distal plate section 5002 of the flexible element 50 against the holder 44 so as to enhance retention of the integration rod module 38 within the casing 36.

In order to balance the urging action the flexible element 50 onto the holder 44, the flexible element 50 further has a second distal plate section 5004 that extends integrally from the other end of the fixing plate section 5000 for resiliently urging a second end of the holder 44 opposite to the first end to press the integration rod module 38 against the inner surface of the casing 36. The casing 36 is formed integrally with an inner support member 64 projecting inwardly therein so as to support the first end of the holder 44 at a position opposite to the first distal plate section 5002 of the flexible element 50 so as to balance the abutment force provided by the stop member 4402, the first distal plate section 5002, and the second distal plate section 5004. Under this condition, the flexible element 50 provides a balanced urging action onto two opposite ends of the holder 44, thereby retaining the integration rod module 38 stably within the light casing 36.

Preferably, the light casing 36 is further formed with a screw hole 62 opposite to the second distal plate section 5004 of the flexible element 50. The positioning device 39 further includes an adjusting screw 60 inserted threadedly through the screw hole 62 in the casing 36 to abut against the holder 44 adjacent to the second end thereof in order to enhance retention of the integration rod module 38 within the casing 36. The employment of the adjusting screw 60 further enhances the stable position of the integration rod module 38. In addition, when it is desired to adjust or alter a position of the integration rod module 38 with respect to the casing 36, after shifting the holder 44 from its initial position with respect to the casing 36, the adjusting screw 60 can be unfastened and is later fastened threadedly into the screw hole 62 in the casing 36.

To summarize the above paragraphs, it is observable that due to employment of the positioning device 39, the retention of the integration rod module 38 within the casing 36 is stable. The position of the integration rod module 38 is not displaced because of terrible shocks due to the employment of the stop member 4402, the flexible element 50.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A positioning device or positioning an integration rod module along an optical path defined by a light source device and a projection lens a projection apparatus, the integration rod module disposed within a casing of the projection apparatus, the integration rod module including an integration rod and a holder that encloses the integration rod therein, a rod cover disposed securely on the casing adjacent to the light source device, and light beams emitted from the light source device into the integration rod via an aperture of the rod cover, the positioning device comprising:

a flexible element having a fixing plate section adapted to be mounted securely on an inner surface of the casing and a first distal plate section extending integrally from one end of said fixing plate section toward the rod cover resiliently urging the holder; and a stop member disposed securely on the holder adjacent to the rod cover and between the first distal plate section and the rod cover, the first distal plate section urging the stop member to facilitate abutment of one end of the integration rod module against the rod cover.

2. The positioning device according to claim 1, wherein the holder has a first end adjacent to the rod cover and a second end opposite to the first end, said flexible element further having a second distal plate section that extends integrally from said fixing plate section toward the second end of the holder for resiliently urging the holder.

3. The positioning device according to claim 2, wherein the casing is formed with a screw hole opposite to said second distal plate section of said flexible element, the positioning device further comprising an adjusting screw inserted threadedly through the screw hole of the casing to abut against the holder adjacent to the second end thereof in order to adjust a position of the integration rod module within the casing.

4. The positioning device according to claim 2, wherein the casing is further formed with an inner support member so as to support the first end of the holder at a position opposite to said first distal plate section of said flexible element.

5. The positioning device according to claim 1, wherein the holder and said stop member are formed integrally.

6. A projection apparatus comprising:
   a light source device for generating light beams;
   a projection lens for projecting an image onto a screen;
   a casing enclosing an optical path defined by said light source device and said projection lens;
   an integration rod module disposed within said casing and on the optical path, and the integration rod module including an integration rod and a holder that encloses said integration rod therein;
   a rod cover disposed securely on said casing adjacent to said light source device, and the light beams emitted from said light source into the integration rod via an aperture of said rod cover; and
   a positioning device for positioning said integration rod module within said casing, said positioning device including:
   a flexible element having a fixing plate section that is mounted securely on an inner surface of the casing, and a first distal plate section extending integrally from one end of said fixing plate section toward said rod cover for resiliently urging said holder to press said integration rod module against said inner surface of said casing at a position opposite to said flexible element; and
   a stop member disposed securely on said holder adjacent to said rod cover to facilitate abutment of said first distal plate section of said flexible element against said holder so as to enhance retention of said integration rod module within said casing.

7. The projection apparatus according to claim 6, wherein said holder has a first end adjacent to the rod cover and a second end opposite to the first end, said flexible element further having a second distal plate section that extends integrally from said fixing plate section for resiliently urging a second end of said holder.

8. The projection apparatus according to claim 7, wherein said casing is formed with a screw hole opposite to said second distal plate section of said flexible element, said positioning device further including an adjusting screw inserted threadedly through said screw hole of said casing to abut against said holder adjacent to the second end thereof in order to adjust a position of said integration rod module within said casing.

9. The projection apparatus according to claim 7, wherein said casing is further formed with an inner support member projecting inwardly therein so as to support said first end of said holder at a position opposite to said first distal plate section of said flexible element.

10. The projection apparatus according to claim 6, wherein said holder and said stop member are formed integrally.

* * * * *